United States Patent [19]

Bauer

[11] E Patent Number: Re. 31,683

[45] Reissued Date of Patent: Sep. 25, 1984

[54] FLUIDIC OSCILLATOR WITH RESONARY INERTANCE AND DYNAMIC COMPLIANCE CIRCUIT

[76] Inventor: Peter Bauer, 13921 Esworthy Rd., Germantown, Md. 20874

[21] Appl. No.: 489,674

[22] Filed: Apr. 28, 1983

Related U.S. Patent Documents

Reissue of:

[64] Patent No.: 4,260,106
Issued: Apr. 7, 1981
Appl. No.: 128,137
Filed: Mar. 7, 1980

U.S. Applications:

[62] Division of Ser. No. 19,250, Mar. 9, 1979.

[51] Int. Cl.[3] ..... F15B 21/12; F15C 1/08

[52] U.S. Cl. ..... 239/11; 137/811; 137/826; 137/836

[58] Field of Search ..... 239/4, 11, 101, 102, 239/589, 590, DIG. 3; 137/808, 810, 811, 826, 827, 829, 832, 835, 836, 839

[56] References Cited

U.S. PATENT DOCUMENTS

| | | | |
|---|---|---|---|
| 3,182,676 | 5/1965 | Bauer | 137/839 X |
| 3,192,387 | 7/1965 | Bauer | 137/815 |
| 3,193,197 | 7/1965 | Bauer | 137/817 X |
| 3,216,439 | 11/1965 | Manion | 137/810 |
| 3,238,960 | 3/1966 | Hatch, Jr. | 137/810 X |

*Primary Examiner*—Andres Kashmikow
*Attorney, Agent, or Firm*—Griffin, Branigan & Butler

[57] ABSTRACT

The fluidic oscillator consists of a resonant fluid circuit having a fluid inertance and a dynamic fluid compliance. The inertance is a conduit interconnecting two locations of a chamber on each side of a working fluid jet issuing into one end of the chamber, the inertance conduit serving to transfer working fluid between the two locations. Through one or more output orifices located approximately at the opposite end of the chamber, the fluid exits from a chamber exit region which is shaped to facilitate formation of a vortex (the dynamic compliance) from the entering fluid. The flow pattern in the chamber and particularly the vortex in the chamber exit region provide flow aspiration on one side and surplus of flow on the opposite side of the chamber, which effects accelerate and respectively decelerate the fluid in the inertance conduit such as to cause reversal of the vortex after a time delay given by the inertance. The vortex in the chamber exit region will thus cyclically alternate in velocity and direction of rotation to direct outflow through the output orifice such as to produce a cyclically repetitive side-to-side sweeping stream our spray pattern whose direction is determined, at any instant in time, as a function of the vectorial sum, at the output orifice, of the tangential vortex flow spin velocity vector and the static pressure vector as well as the dynamic pressure component, both directed radially from the vortex. By changing these parameters by suitable design measures and operating conditions and by appropriately configuring the oscillator, sweep angle, oscillation frequency, distribution, outflow velocity, break up into droplets, etc. can be readily controlled over large ranges.

5 Claims, 16 Drawing Figures

FIG.10
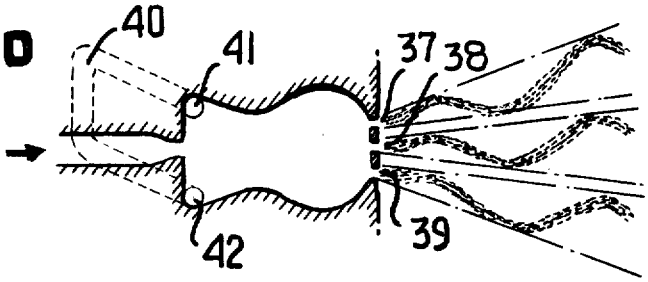
FIG.11
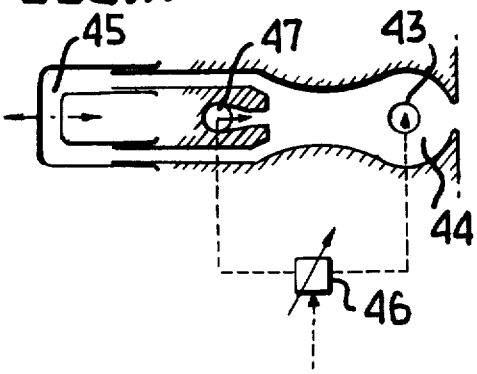
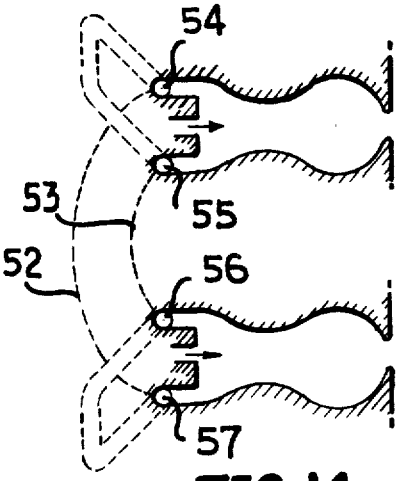
FIG.12
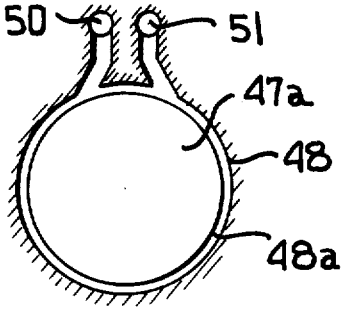
FIG.14
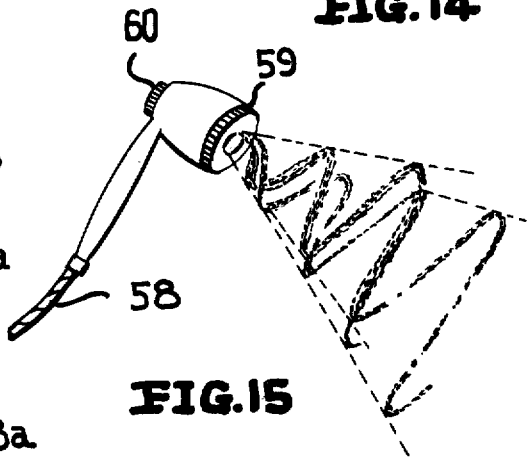
FIG.13
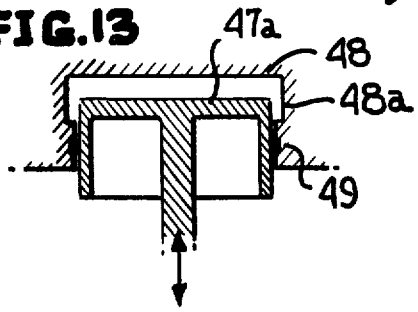
FIG.15

FLUIDIC OSCILLATOR WITH RESONARY INERTANCE AND DYNAMIC COMPLIANCE CIRCUIT

Matter enclosed in heavy brackets [ ] appears in the original patent but forms no part of this reissue specification; matter printed in italics indicates the additions made by reissue.

This is a division of application Ser. No. 19,250 filed Mar. 9, 1979.

BACKGROUND OF THE INVENTION

The present invention relates to improvements in fluidic oscillators and particularly to a novel fluidic oscillator capable of providing a dynamic output flow of a broad range of properties which is obtainable by simple design variations and which can be further readily controlled during operation by appropriate adjustment means to achieve extensive performance flexibility, thus facilitating a wide variety of uses.

Fluidic oscillators and their uses as fluidic circuit components are well known. Fluidic oscillators providing dynamic spray or flow patterns issuing into ambient environment have been utilized in such manner in: shower heads, as described in my U.S. Pat. No. 3,563,462; in lawn sprinklers, as described in U.S. Pat. No. 3,432,102; in decorative fountains, as described in U.S. Pat. No. 3,595,479; in oral irrigators and other cleaning apparatus, as described in U.S. Pat. No. 3,468,325; (also see U.S. Pat. Nos. 3,507,275 and 4.052,002, etc.). Most of these oscillators are constructed to produce outflow patterns which are suitable only for use in the specific apparatus for which they were designed and lack flexibility and adjustability for use in other applications. In most applications for prior art oscillators it has been found that performance is adversely affected by relatively small dimensional variations in the oscillator passages and chamber. It has also been found that most prior art oscillators require configurations of relatively large dimensions to satisfy particular performance requirements such that they are barred from many uses by practical size restrictions. Furthermore, most prior art oscillators have not had the capability for extensive in-operation adjustments of performance characteristics to fulfill numerous uses necessitating such adjustment capabilities.

Many prior art fluidic devices, such as in U.S. Pat. Nos. 3,016,066 and 3,266,508, have relied in operation on well established fluidic principles, such as the Coanda effect. It is, in my opinion, this reliance on such well-known effects which has brought about the aforementioned limitations and disadvantages.

It is an object of the present invention to provide a fluidic oscillator which functions largely on different principles than previous fluidic oscillators and, therefore, overcomes the aforementioned limitations and disadvantages, and provides capabilities hitherto unavailable to meet application requirements for which prior art fluidic oscillators have not been suited.

It is another object of the present invention to provide a fluidic oscillator whose outflow pattern performance can be varied over broad ranges by simple design measures.

It is yet another object of the present invention to provide a fluidic oscillator which is relatively insensitive to dimensional manufacturing tolerances and dimensional variations resulting from its operation.

It is a further object of the present invention to provide a fluidic oscillator of relatively small dimensions to meet practical size restrictions of many applications. For example, where as most prior art fluidic oscillators require, for satisfactory functioning, lengths, between the feed-in supply fluid and the final outlet opening, of at least 10 (but more often 12 to 20 and in some cases as much as 30) times the respective supply feed-in nozzle widths, the present invention fluidic oscillator operates already with such relative lengths of as little as 5. Similarly, whereas most prior art fluidic oscillators require relative widths for the total channel configuration of at least 7 or more, the present invention oscillator configuration spans a relative width of 5 or less in many applications. One can readily appreciate the application advantages offered by such practical size reductions in the total oscillator configuration area to about one half or one third.

It is yet another object of the present invention to provide a fluidic oscillator allowing and facilitating extensive adjustments of performance characteristics over broad ranges during operation. Oscillation frequency and angle of output flow sweep pattern and, therefore, also such dependent characteristics as waveform, dispersal distribution, velocity, etc. may be adjusted by simple means such that performance can be varied and adapted to changing requirements during operation. Furthermore, it is also an object of the present invention to provide a fluidic oscillator whose performance may be adjusted or modulated continuously in the aforementioned characteristics by externally applied fluid control flow pressure signals. By way of an example, tests have been performed with experimental models of fluidic oscillators of the present invention, which have shown a frequency adjustment range of over one octave and an output sweep angle adjustment range from almost zero degress to over ninety degrees by application of an external fluid pressure flow to the oscillator control input connection with control pressure ranging between zero gage (no control flow) and the same pressure as supplied to the oscillator fluid power input. Additionally, inertance adjustments of the fluid inertance conduit of the oscillator have shown practical continuous control over oscillation frequency during operation over several octaves.

It is still another object of the present invention to provide arrays of two or more similar fluidic oscillators capable of being accurately synchronized with each other in any desired phase relationship by means of appropriate simple fluid conduit interconnections between such oscillators.

It is further an object of the present invention to provide fluidic oscillators for use in shower heads to provide dispersal of water flow into suitable spray and/or massaging and improved cleansing effects due to the cyclically repetitive flow impact forces on body surfaces, to further provide shower heads including fluidic oscillators for the aforementioned purposes, wherein oscillation frequency and spray angle are adjustable over broad ranges, and wherein the oscillators, if more than one are used, are synchronized with each other, and wherein manual controls are provided for such adjustments, and wherein the shower head has manually settable valving means for the mode selection of conventional steady spray or oscillator generated spray and massaging effects or any combination thereof.

SUMMARY OF THE INVENTION

The invention concerns a fluidic oscillator for use in dispersal of liquids, in mixing of gases, and in the application of cyclically repetitive momentum or pressure forces to various materials, structures of materials, and to living body tissue surfaces for therapeutic massaging and cleansing purposes.

The fluidic oscillator consists of a chamber, a fluid inertance conduit interconnecting two locations within the chamber, and a dynamic compliance downstream of these locations. A fluid jet is issued into the chamber from which the fluid exits through one or more small openings in form of one or more output streams, the exit direction of which changes angularly cyclically repetitively from side to side in accordance with the oscillation imposed within the chamber on the flow by the dynamic action of the flow itself.

The fluid inertance conduit interconnects two chamber locations on each side of the issuing jet, and acts as a fluid transfer medium between these locations for fluid derived from the jet. The exit region of the chamber is shaped to facilitate formation of a vortex, which constitutes the dynamic compliance, such that the jet, in passing through the chamber, tends to promote and feed this vortex in a supportive manner in absence of any effect from the inertance conduit and, after the conduit's fluid inertance responds to the chamber-contained flow pattern influences, the jet will tend to oppose this vortex, will slow it down, and reverse its direction of rotation. The chamber-contained flow pattern, at one particular instant in time, consists of the jet issuing into the chamber, expanding somewhat, and forming a vortex in its exit region. In view of the continuous outflow of fluid from the periphery of the vortex through the small exit opening, the vortex would like to aspirate flow near the chamber wall on the side where the jet feeds into the vortex and it would like to surrender flow near the opposite chamber wall. Until the mass of the fluid contained in the inertance conduit, which interconnects the two sides of the chamber, is accelerated by these effects of the vortex on the chamber flow pattern, flow can be neither aspirated on one side nor surrendered on the other side, and the flow pattern sustains itself in this quasi-steady state. As soon as the fluid in the inertance conduit is accelerated sufficiently to feed the aspiration region and deplete the surrendering region, the flow pattrn will cease to feed the vortex in the chamber exit region and the vortex will dissipate. Even though now the cause for the acceleration of the mass of fluid in the inertance conduit has ceased to exist, this mass of fluid continues to move due to its inertance and it is only gradually decelerating as its energy is consumed in first dissipating and them reversing the previous flow pattern state in the chamber to its symmetrically opposite state, at which time the mass of fluid in the inertance conduit will be accelerated in the opposite direction; after which the events continue cyclically and repetitively in the described manner. An outlet opening from the exit region of the chamber issues a fluid stream in a sweeping pattern determined, at the outlet opening, by the vectorial sum of a first vector, tangential to the exit region vortex and a function of the spin velocity, and a second vector, directed radially from the vortex and established by the static pressure in the chamber together with the dynamic pressure component directed radially from the vortex. By changing the average static pressure and the vortex spin velocity and their respective relationship by suitable design measures, the angle subtended by the sweeping spray can be controlled over a large range. By suitably configuring the oscillator, concentrations and distribution of fluid in the spray pattern can be readily controlled. By changing the inertance of the fluid inertance conduit, the oscillation frequency can be varied. By externally imposed pressurization of the chamber exit region, the oscillation frequency and the sweep angle can be readily controlled. Two or more oscillators can be synchronized together in any desired phase relationship by means of appropriate simple interconnections.

BRIEF DESCRIPTION OF THE DRAWINGS

The above and still further objects, features, and advantages of the present invention will become apparent upon consideration of the following detailed description of one specific embodiment thereof, especially when taken in conjunction with the accompanying drawings, wherein:

FIG. 10 is a top view inplan of the silhouette of a fluidic oscillator of the present invention with a diagrammatic representation of the waveforms of the output sprays issued from a typical plural-outlet exit region of a fluidic oscillator according to the present invention;

FIG. 11 is a top view in plan of the silhouette of a fluidic oscillator of the present invention, showing diagrammatically means for adjustment of length of the inertance conduit interconnection and indicating external connections for additional performance adjustments and control in accordance with the present invention;

FIGS. 12 and 13 are diagrammatic top and side view sections, respectively, of adjustment means for varying the inertance for use as the fluid inertance conduit of, for example, the oscillators of FIGS. 1, 10, 11, or 14 in accordance with the present invention;

FIG. 14 is a diagrammatic representation of the top views in plan of a multiple fluidic oscillator array synchronized by interconnecting conduit means in accordance with the present invention;

FIG. 15 is a perspective external view of a typical shower head, equipped with performance adjustment means and mode selection valving and containing two synchronized fluidic oscillators in accordance with the present invention, showing diagrammatically the output waveforms associated therewith;

DESCRIPTION OF THE PREFERRED EMBODIMENTS

Figure 1:
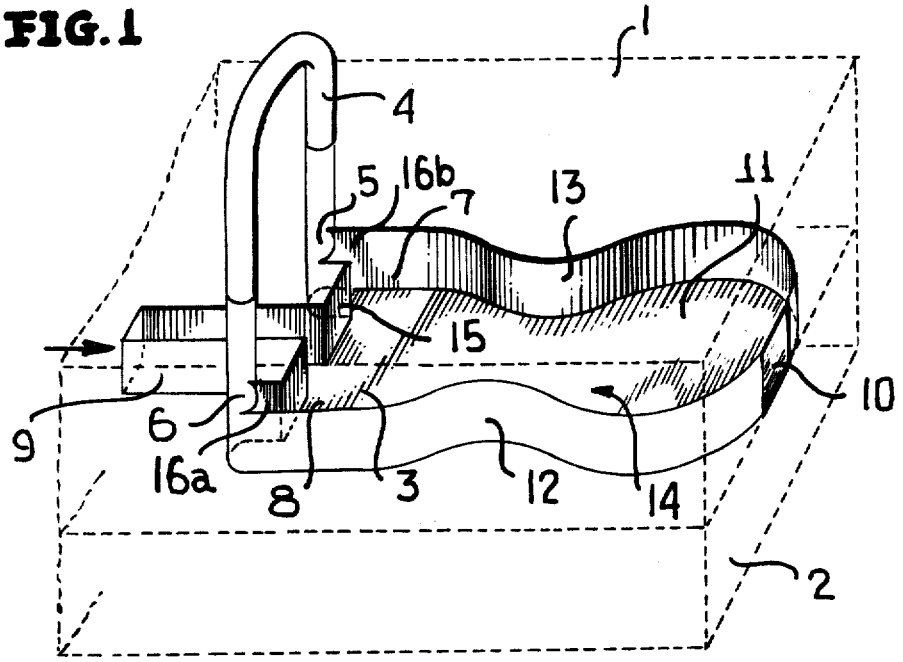
FIG. 1 is an isometric representation of a fluidic oscillator constructed in accordance with the present invention as could be seen if, for example, the device were constructed from a transparent material.

Specifically with reference to FIG. 1 of the accompanying drawings, an oscillator 14 is shown as a number of channels and cavities, etc., defined as recesses in upper plate 1, the recesses therein being sealed by cover plate 2, and a tubing or inertance conduit interconnection 4 between two bores 5 and 6 extending from the cavities through the upper plate 1. It is to be understood that the channels and cavities formed as recesses in plate 1 need not necessarily be two dimensional but may be of different depths at different locations, with stepped or gradual changes of depth from one location to another. For ease in reference, however, entirely planar elements are shown herein. It is also to be understood that, whereas a two-plate (i.e. plates 1 and 2) structure is implied in each of the embodiments, this is intended only to show one possible means of construction for the oscillator of the present invention. The invention itself resides in the various passages, channels, cavities, conduits, etc., regardless of the type of structure in which they are formed. The oscillator 14, as formed by recesses in plate 1 and sealed by plate 2, includes an upstream chamber region 3 which is generally of an approximately 'U'-shaped outline, having an inlet opening 15 approximately in the center of the base of the 'U', which inlet opening 15 is the termination of inlet channel 9 directed into the upsteam chamber region 3. The open 'U'-shaped upstream chamber region 3 reaches out to join the chamber exit region 11 which is generally again 'U'-shaped, whereby the transition between the two chamber regions 3 and 11 is generally somewhat necked down in width near chamber wall transition sections 12 and 13, such that the combination in this embodiment may give the appearance of what one might loosely call an hour-glass shape. An outlet opening 10 from the base of the U-shaped chamber exit region 11 leads to the environment external to the structure housing the oscillator. Short channels 16a and 16b lead in a generally upstream direction from the upstream chamber region 3 on either side of inlet opening 15 (from approximate corner regions 8 and 7) to bores 6 and 5, respectively.

Figure 5:
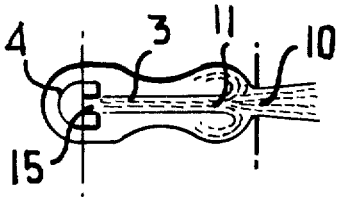
FIGS. 5, 6, 7, 8 and 9 are diagrammatic illustrations showing successive states of flow within a typical fluidic oscillator of the present invention.
Figure 6:
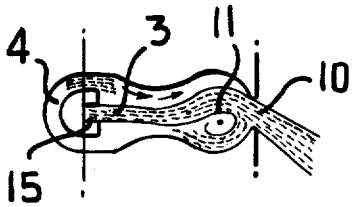
Figure 7:
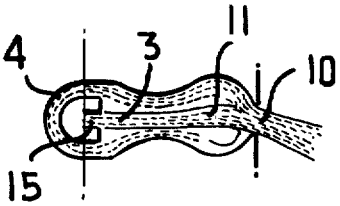
Figure 8:
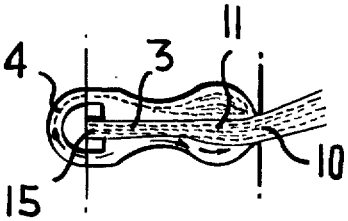
Figure 9:
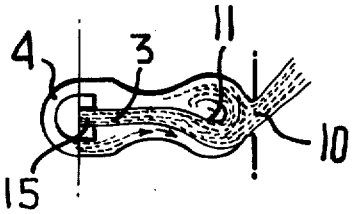

Operation of oscillator 14 is best illustrated in FIGS. 5 through 9. For purposes of the description herein, it is assumed that the working fluid is a liquid and that the liquid is being issued into an air environment; however, it is to be noted that the oscillator of the present invention operates as well with gaseous working fluids, and that any working fluid can be issued into the same or any other fluid environment. Upon receiving pressurized fluid through inlet opening 15, a fluid jet is issued and flows through upstream chamber region 3 and chamber exit region 11 and egresses through output opening 10, as shown in FIG. 5. However, as a consequence of the expansion of the fluid jet during its transition through chamber regions 3 and 11 and a certain loss of cohesiveness of the jet due to shear effects some portions of its flow are peeled off before egressing through opening 10, and such portions of flow quickly fill voids in the chamber cavities as well as filling the inertance conduit interconnection 4, as further indicated in FIG. 6. Asymmetries inherent in any structure and asymmetries inherent in the portions of peeled-off flow on either side of the jet ensure that complete filling occurs, for all practical purposes, almost instantaneously. The same aforementioned inherent asymmetries will cause more flow to be peeled back on one side of the jet than on the other side, which will necessarily cause the jet to veer into a vortex flow pattern tending toward the pattern indicated in the chamber exit region 11 of FIG. 6 (or its symmetrically opposite pattern). The tendency of the jet to veer off into the vortex pattern in FIG. 6 is supported and reinforced by the increasingly larger amount of peeled off flow due to the more angled approach of the jet to outlet opening 10. Opposed to this tendency is the jet flow momentum which acts toward a straightening of the jet. A mutual balance of these influences on the jet is necessarily reached before the jet can deflect completely toward the respective side of the chamber exit region 11. By the inherent nature of this flow pattern, a powerful aspiration region establishes itself in the approximate area where the jet flow enters the vortex near the transition between chamber regions 3 and 11 on the opposite side of the jet to the center of the vortex, and the vortex would like to surrender flow on its side of the jet. The only path which can permit an exchange of flow between this aspirating region and the surrendering region is along both sides of the jet in an upstream direction through the sides of upstream chamber region 3 and via inertance conduit interconnection 4. However, as the inertance conduit interconnection 4 respresents a significant inertance and thus an impedance to flow changes by virtue of its physical design, the mass of fluid contained within this conduit interconnection 4 and within the remainder of this path between the aspirating and surrendering regions has to be accelerated before a flow between these two regions may influence and change the described quasi-steady state flow pattern shown in FIG. 6. As soon as the flow in inertance conduit connection 4 is accelerated sufficiently to feed the aspiration region and deplete the surrendering region, the previously established flow pattern will gradually cease to feed the vortex in chamber exit region 11 and the vortex will dissipate, as indicated in FIG. 7. Even though now the cause for the acceleration of the mass of fluid within inertance conduit interconnection 4 has ceased to exist, this mass of fluid continues to move due to its inertance and it will only gradually decelerate as its dynamic energy is consumed in first dissipating and later gradually reversing the previous flow pattern state in the chamber to its symmetrically opposite state, as indicated in FIGS. 8 and 9, after which this mass of fluid in the inertance conduit connection will begin to be accelerated in the opposite direction; thereafter, the sequence of events continues cyclically and repetitively in the described manner. The sequence of events depicted in FIGS. 6, 7, 8 and 9 (in this order), and as described above, represents flow pattern states and their changes at various times within one half of an oscillation cycle. In order to visualize the events of the second half cycle of the oscillation, one need only symmetrically reverse all depicted flow patterns, starting with the one shown in FIG. 6 and continuing through FIGS. 7, 8 and 9.

It should perhaps be mentioned here that, whereas the inertance effect of inertance conduit 4 is clearly analogous to an electrical inductance L, the effect of a reversing vortex spin within a confined flow pattern, as occuring within the oscillator of the present invention, may be considered to represent a dynamic compliance (even when operating with incompressible fluids), and it provides an analogous effect not unlike the one of an electrical capacitance C. From the preceding descriptions, one can readily visualize the alternating energy exchange between the inertance of the fluid in the inertance conduit interconnection and the dynamic compliance of the vortex flow pattern to be somewhat analogous to the mechanism of a resonant electrical inductance/capacitance (LC) oscillator circuit.

As a consequence of the aforementioned alternating vortical flow pattern in chamber exit region 11, flow egresses through output opening 10 in a side-to-side sweeping pattern determined, at the ouput opening, by the vectorial sum of a first vector, tangential to the exit region vortex and a function of the spin velocity, and a second vector, directed radially from the vortex and established by the static pressure in chamber exit region 11 together with the dynamic pressure component directed radially from the vortex at output opening 10. A resulting typical output flow pattern 16 is shown diagrammatically in FIG. 4. It can be seen, in FIG. 4, that this output flow pattern 16 takes on a sinusoidal shape, wherein the wave amplitude increases with downstream distance. Since the shown pattern 16 represents the state in one instant of time, one must visualize the actual dynamic situation; the wave of pattern 16 travels away from the output opening 10 as it expands in amplitude subtending angle $\alpha$.

Figure 2:
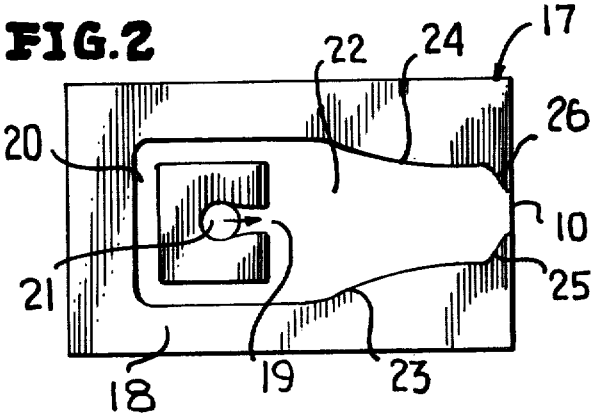
FIG. 2 is a top view in plan of the bottom plate of another fluidic oscillator according to the present invention.

Referring to FIG. 2, the shown oscillator 17 is represented with only the plate 18 within which the recesses forming the oscillator's channels and cavities are contained, the cover plate being removed for purposes of simplification and clarity of description. In fact, for most of the oscillators shown and described hereinbelow, the cover plate has been removed for these purposes. Oscillator 17 includes an inlet opening 19 similar to inlet opening 15 of FIG. 1 and an inertance conduit 20 similar to inertance conduit interconnection 4 of FIG. 1, except that the latter is in form of a tubing interconnection external to the oscillator upper plate 1 of FIG. 1 and the former is in form of a channel interconnection shaped within plate 18 of FIG. 2 itself. Inlet passage and hole 21 corresponds to inlet channel 9 of FIG. 1. An upstream chamber region 22 and a chamber exit region 23 correspond to upstream chamber region 3 and chamber exit region 11 in FIG. 1, respectively, except that the chamber wall transition sections 23 and 24, corresponding to sections 12 and 13 of FIG. 1, are inwardly curved in a downstream direction until they meet with sharply inwardly pointed wall sections 25 and 26 which lead to output opening 10 (same as output opening 10 in FIG. 1). Chamber exit region 23, even though of slightly different shape to the corresponding region 11 of FIG. 1, serves the same purpose as described before. Whereas the necked down transition between regions 3 and 11 of FIG. 1 provides certain performance features under certain specific operating conditions, the inwardly curved wall transition of wall sections 23 and 24 of FIG. 2 provide other performance features under different operating conditions without changes in fundamental function of the oscillator, already described in relation to FIG. 1. For example, the chamber regions 22 and 23 cause the output spray pattern to provide smaller droplets (amoung other features) than the hour-glass shape of the corresponding regions of FIG. 1. Inertance conduit 20, being within plate 18, does not affect the oscillation differently to inertance conduit 4 of FIG. 1, except insofar as a different inertance results due to different physical dimensions. Fundamentally, the inertance is a function of the contained fluid density and it is proportional to length of the conduit and inversely proportional to its cross-sectional area. Consequently, longer conduits and/or conduits with smaller cross-sectional areas provide larger inertances and thus cause lower oscillation frequencies of the oscillator.

Figure 3:
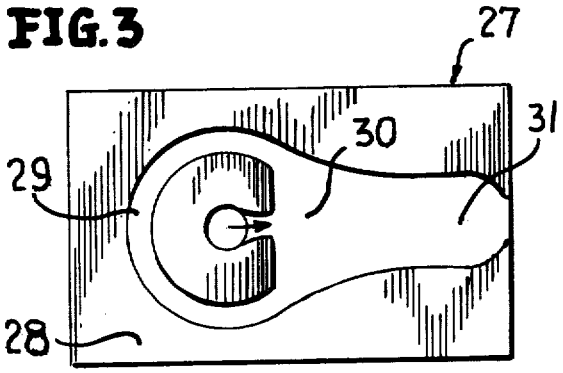
FIG. 3 is a top view in plan of the bottom plate of another fluidic oscillator according to the present invention.

Referring to FIG. 3, an oscillator 27 is again represented with only the plate 28 within which the recesses forming the oscillator's channels and cavities are contained, depicted as such for the same reason as already described in relation to FIG. 2. The oscillator 27 of FIG. 3 has the same general configuration shape as shown for oscillator 17 of FIG. 2, except that the inertance conduit 29 takes a circular path and chamber regions 30 and 31 define a more smoothed out wall outline even more inwardly curved and already beginning its curvature approximate to both ends of inertance conduit 29. As discussed in relation to FIG. 2, different layouts of inertance conduits have no bearing on the fundamental oscillator operation, yet the flexibility of layout provides distinct advantages in design and construction of actual products comprising the oscillator of the present invention, and it is a particular purpose of FIGS. 1, 2, 3, and 4 to show such flexibility. Oscillator 27 of FIG. 3, in view of its discussed more inwardly curved smoothed out chamber wall outline, in comparison with oscillator 17 of FIG. 2, provides certain different performance characteristics, for example narrower spray output angles, more cohesive output flow with larger droplets in a narrower range of size distribution, etc. The fundamental function and operation of oscillator 27 is the same as already described in relation with the oscillator 14 of FIG. 1.

Figure 4:
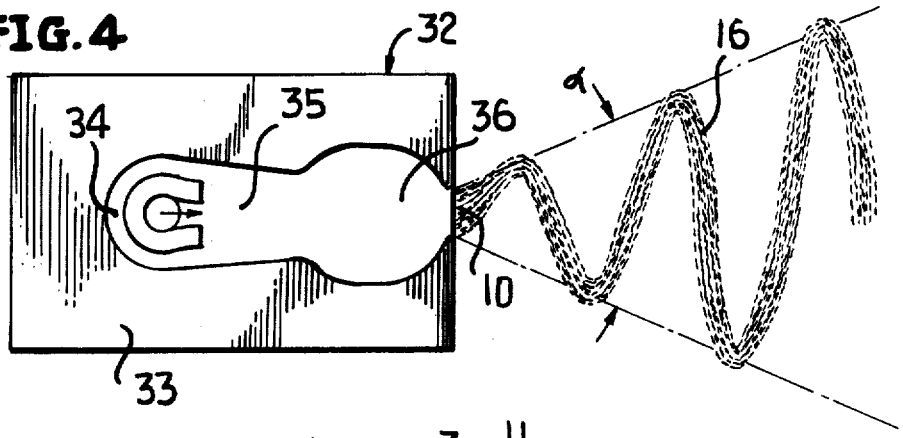
FIG. 4 is a top view in plan of the bottom plate of another fluidic oscillator of the present invention, illustrating diagrammatically the output waveform associated therewith.

Referring specifically to FIG. 4, an oscillator 32 is represented with only the plate 33 within which the recesses forming the oscillator's channels and cavities are contained, depicted as such for the same reason as already described in relation to FIG. 2. Oscillator 32 has the same general configuration and shape as shown for oscillator 14 of FIG. 1, except that the inertance conduit 34 is shaped similarly to inertance conduit 29 of FIG. 3 and that it is also contained as a recess within plate 33, corresponding to the construction shown in FIG. 3, and that inertance conduit 34 is laid out in a very short path, the effect of which is an increase in oscillation frequency for reasons already discussed in relation to FIG. 2. Chamber region 35 is simply adapted in its width near inlet opening 19 to mate its walls with the outer walls of the ends of inertance conduit 34, which has no bearing on the general function and operation of the oscillator 32 as distinct from oscillator 14, 17, and 27 (FIGS. 1, 2, and 3, respectively). Chamber exit region 36 corresponds to chamber exit region 11 of FIG. 1 in configuration and function. In comparison with, for example, the configuration of oscillator 27 of FIG. 3, the chamber shape, particularly the wider and generally larger exit region 36 of FIG. 4, will cause different performance characteristics; for example, wider spray output angles $\alpha$, still more cohesive output flow with narrower size distributions of droplets, smoother output waveforms of more sinusoidal character, etc. A typical output waveform applicable in general to all the oscillators of the present invention is diagrammatically shown as the output flow pattern 16 of FIG. 4. The fundamental function and operation of oscillator 32 of FIG. 4 is the same as already described in relation with oscillator 14 of FIG. 1.

It is to be noted, with respect to the effects of relatively gross changes of inertances of the inertance conduits in relation to particularly the width and length dimensions of chamber exit regions, that definite performance tendencies have been experimentally verified, as indicated in the following: Very high relative inertances cause output waveforms to take on more and more trapezoidal characteristics. Gradually reduced relative inertances cause output waveforms to approach and eventually attain a sinusoidal character. And further relative reductions in inertance cause sharpening of wavepeaks whereby waveforms eventually attain triangular shapes. Additional relative inertance reductions result in little, if any, additional wave shape changes but they cause gradual sweep or spray angle reductions (which up to this point remain virtually constant with inertance changes). Naturally, oscillation frequencies changed during these experiments in accordance with the different relationship between applicable characteristic oscillator parameters and employed inertances.

Design control over output waveforms in an important aspect of the present invention since the output waveform largely establishes the spray flow distribution or droplet density distribution across the output spary angle and different requirements apply to different products and uses. For example, trapezoidal waveforms generally provide higher densities at extremes of the sweep angle than elsewhere. Sinusoidal waveforms still provide somewhat uneven distributions with higher densities at extremes of the sweep angle and usually lower densities near the center. Triangular waveforms generally offer even distribution across the sweep angle.

Referring to FIG. 10, an oscillator of the general type illustrated in FIG. 1 is modified by replacing output opening 10 of FIG. 1 with three output openings 37, 38, and 39 located in the same general area. In fact, any number of output openings may be provided along the frontal (output) periphery of chamber exit regions at any desired spacings and of same or different sizes. Output openings 37, 38, and 39 in FIG. 10 will each issue an output flow pattern which will exhibit the same characteristics as described in detail in relation to FIGS. 1 or 4. The sweep angles of the multiple output flow patterns may be separated or they may overlap, as required by performance needs. Waveforms will be of generally identical phase relationship (and frequency). Inertance conduit interconnection 40 is shown to interconnect areas 41 and 42 directly without employment of intermediate channels such as ones shown in FIG. 1 as short channels 16 and 17. This variation is shown purely to indicate another design option possible when size and other construction criteria allow or impose such differences, and it does not affect the fundamental function and operation of the oscillator shown in FIG. 10, which is the same as already described in relation with the oscillator 14 of FIG. 1. The purpose for multiple output openings in oscillators, as illustrated in FIG. 10, is to be able to obtain different output spray characteristics; for example, different distributions, spray angles, smaller droplet sizes, low spray impact forces, several widely separated spray output patterns, etc.

Referring to FIG. 11, an oscillator of the general type illustrated in FIG. 1 is modified by provision of an opening 43 into the chamber exit region 44, by employment of an inlet opening and an inlet hole 47 like inlet opening 19 and inlet passage and hole 21, both in FIG. 2, and by utilization of an adjustable length inertance conduit interconnection 45. FIG. 11 shows further fluid supply connections to the inlet hole 47 as well as to opening 43, both leading from valving means 46, represented in block form. The oscillator of the arrangement in FIG. 11, operating in the same way as oscillator 14 of FIG. 1, upon receiving pressurized fluid through opening 47, is not affected by the presence of opening 43 as long as the feed to opening 43 is closed off, and it is not affected by the presence of the adjustable length inertance conduit interconnection 45, except to the extent that the oscillation frequency will change as a function of a change in length of interconnection 45. The oscillation frequency can be further changed by adjustment of valving means 46 in admitting pressurized fluid through opening 43 into region 44. Such admittance of fluid is of relatively low flow velocities and generally does not affect the fundamental flow pattern events in region 44. However, as pressure is increased to opening 43, predominantly the static pressure increases in region 44, and also in the remainder of the oscillator. This has two main effects: For one, the supply flow through opening 47 will be reduced due to the backpressure increase experienced, and consequently the oscillation frequency will be reduced, as the jet velocity reduces also; and secondly, the static pressure increases particularly in region 44. A change in the vectorial sum, at the oscillator output opening, of the various velocities, described in detail in relation to the operation of the oscillator embodiment shown in FIG. 1, such that the second vector which is directed radially from the vortex increases in relation to the first vector which is tangential to the exit region vortex, and consequently the output flow sweep angle decreases. Thus one can see that an adjustment of pressure supplied to opening 43 changes oscillation frequency and output flow sweep angle. At the same time, only minimal total flow rate changes for the oscillator are experienced, because pressurization of region 44 via opening 43 and the inflow of additional fluid caused thereby through opening 43 is to some extent compensated by the concomitant decrease in supply flow through inlet hole 47. Pressure adjustment by way of valving means 46 may be applied exclusively to opening 43, whilst holding pressure to inlet hole 47 constant, or both pressure supplies may be independently adjusted, or both pressures may be adjusted by valving arrangements ganged together in any desired relationship. Furthermore, the pressure (and flow) input into opening 43 may be fed from any suitable source of fluid, for example one which will provide a time or event dependent variation in pressure such as to control or modulate the oscillator onput as a function thereof. Experimental results have shown practical a frequency adjustment range of over one octave and an output sweep angle adjustment range from almost zero degrees to over ninety degrees without exceeding the supply pressure to inlet hole 47 by the adjustment pressure to opening 43. In addition to the performance adjustments afforded by the aforementioned means, oscillation frequency is independently adjustable by means of length adjustment of the adjustable length inertance conduit interconnection 45, which is simply an arrangement similar to the slide of a trombone, whereby the length of the conduit may be continuously varied. Experiments have shown practical adjustment ranges up to several octaves employing such an arrangement. It is feasible to provide valving arrangements ganged to adjust not only the pressures to opening 43 and to inlet hole 47 but also mechanically coupled to adjust the length of inertance conduit interconnection 45 with a single control means, such that, for example, a single manually rotatable knob causes an oscillator output performance change over a further extended very wide range. The aforementioned performance adjustment capabilities are particularly useful in processes where in-operation requirements vary. In other applications, adjustablity is needed to adapt performance to subjective requirements; for example, oscillators employed in massaging shower heads for therapentic or simply recreational purposes would exhibit particularly advantageous appeal if their effects were capable to be adjusted to a wide range of individual subjective needs and desires.

Referring to FIGS. 12 and 13, a compact adjustment means for varying the inertance of the inertance conduit interconnection of any of the oscillators shown in FIGS. 1 through 11 and 14 is illustrated. A cylindrical piston 47a is axially movably arranged within a cylindrically hollow body 48, wherein piston 47a is peripherally sealed by seal 49. A portion of the body 48 is of a somewhat larger internal diameter than piston 47a, such that an annular cylindrical void 48a is formed between piston 47a and body 48 when piston 47a is fully moved into body 48, and such that, in a partially moved-in position of piston 47a, a partially annular and partially cylindrical void is formed, and such that a cylindrical void is formed with piston 47a is withdrawn further. The internal peripheral wall of the cylindrical hollow body 48 has two conduit connections in proximity to each other and oriented approximately tangentially to the internal cylindrical periphery, wherein the conduit entries point away from each other. The conduits lead to interconnection terminals 50 and 51, respectively. Since the inertance between the two terminals 50 and 51 is a proportional function of the length and an inversely proportional function of the cross-sectional area of the path a fluid flow would be forced to take when passing between terminals 50 and 51 through the means shown in FIGS. 12 and 13, it can be shown that the inertance of this path is continuously varied as piston 47a is moved in body 48 and as the internal void changes shape and volume between one extreme of a cylindrical annulus, when highest inertance is obtained, and the other extreme of a cylinder, when lowest inertance is reached. In comparison with the variable inertance conduit interconnection 45 of FIG. 11, the arrangement of FIGS. 12 and 13 offers compactness, simpler sealing, and a less critical construction. Replacing the slide of interconnection 45 of FIG. 11 with the arrangement of FIGS. 12 and 13 by connecting terminals 50 and 51 respectively to the two conduits stubs opened up by the removal of interconnection 45, all operation and adjustment described in relation to FIG. 11 applies.

Referring to FIG. 14, two oscillators of the general type illustrated in FIG. 1 are interconnected by suitable synchronizing conduits 52 and 53 between symmetrically positioned locations of the respective inertance conduit interconnections, particularly between such locations in proximity to the chamber entries 54, 55, 56, and 57 of the inertance conduit interconnections. Conduit 52 connects entry 54 with entry 57 and conduit 53 connects entry 55 with entry 56. The two oscillators in the shown connection will oscillate in synchronism, provided they are both of a like design to operate at approximately the same frequencies if supplied with the same pressure, and their relative phase relationship will be 180 degrees apart when viewed as drawn. Interchanging the connections of two entries only at one oscillator, for example re-connecting conduit 52 to entry 55 and conduit 53 to entry 54 will provide an in-phase relationship. Different lengths and unequal lengths of conduits 52 and 53, as well as changes of the connecting locations of synchronizing conduits along the inertance conduit interconnections result in a variety of different phase relationships. It is also feasible to thusly interconnect unlike oscillators to provide slaving at harmonic frequencies. More than two oscillators may be interconnected and synchronized in like manner and such arrays may be interconnected to provide different phase relationships between different oscillators. Furthermore, series interconnections between plural oscillators may be employed, wherein synchronizing conduits can be employed to provide the inertance previously supplied by the inertance conduit interconnections and wherein individual oscillator's inertance conduit interconnections may be omitted.

Referring to FIG. 15, a typical hand-held massaging shower head is illustrated to contain two synchronized oscillators of the general type shown in FIG. 1 interconnected by an arrangement as indicated in FIG. 14, and equipped with variable performance adjustment arrangements generally described in relation to FIG. 11 and FIGS. 12 and 13. The shower head is supplied with water under pressure through hose 58 and it commonly contains valving means for the mode selection between conventional steady spray and massaging action. Manual controls 59 and 60 are arranged such as to advantageously provide not only mode selection control but also the adjustment control for frequency and sweep angle (as described in relation to FIG. 11, by means of the pressure adjustment to opening 43 and/or by ganged or combined pressure adjustment to supply hole 47), all the preceding adjustment controls and the mode selection being preferably arranged in one of the two manual controls 59 or 60, and to provide the independent frequency adjustment (as described in relation to FIGS. 11, 12 and 13, by means of the inertance adjustment of inertance conduit interconnection 45 or by means of the arrangement shown in FIGS. 12 and 13) in the other of the two manual controls 59 or 60. The gauged or combined mode selection and frequency and sweep angle control may be a valving arrangement which allows supply water passage only to the conventional steady spray nozzles when the manual control is in an extreme position. When the manual control is rotated by a certain angle, the valving arrangement permits supply water passage also to the supply inputs of the oscillators and on further control rotation, water passage is allowed only to the supply inputs of the oscillators. Yet additonal rotation of the manual control will reduce the frequency and sweep angle by adjustment of the respective pressures to the oscillators. The independent frequency adjustment is a mechanical arrangement facilitating the translational motion needed to the respective inertance conduit interconnection adjustment described earlier in detail. Thus for example, the respective manual control 59 or 60 may be adjusted by rotation between two extreme positions whilst the oscillation frequency changes between corresponding values. It should be noted here that the frequency adjustments bear such a relationship with respect to each other that the frequency range ratio of one is approximately multiplied by the frequency range ratio of the other to obtain the total combined frequency range, which is, therefore, greatly expanded due to the two control adjustments.

Figure 16:
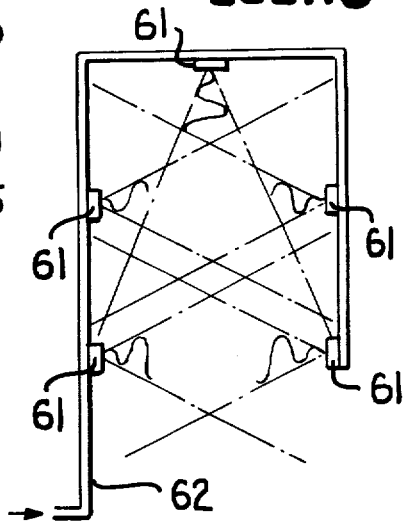
FIG. 16 is a diagrammatic front view representation of a shower or spray booth or shower or spray tunnel multiple spray head and supply plumbing installation, utilizing as spray heads or nozzles the fluidic oscillator of the present invention.

In FIG. 16 there is illustrated an application of the oscillator of the present invention in a shower or spray booth (or shower or spray tunnel), wherein a plurality of oscillators in form of identical nozzles 61 is arranged and mounted in various locations along a liquid supply conduit 62 which feeds liquid under pressure to each nozzle 61. Conduit 62 is shaped along its length into a door-outline or any appropriate form for the particular application. Nozzles 61 are oriented inwardly such as to provide overlapping spray patterns. Nozzles 61 are preferably oriented with the plane of their spray patterns in the plane defined by the shape of supply conduit 62. It is the purpose of such an arrangement to provide large spray area coverage with minimal flow consumption, for example in shower booths or in spray booths, wherein one or more such arrangements may be installed. The oscillator nozzles of the present invention not only are capable of providing the large area coverage with relatively fine spray at minimal flow consumption, but they provide additional advantages, in arrangements as shown in FIG. 16, of being much less liable to clogging in comparison with conventionally utilized steady stream or spray nozzles due to the latter's small flow openings in relation to the much larger oscillator channels. Furthermore, for equal effect, orders of magnitude larger numbers of conventional nozzles are needed than the few wide angle spray nozzles required to provide the same coverage.

While I have described and illustrated various specific embodiments of my invention, it will be clear that variations from the details of construction which are specifically illustrated and described may be resorted to without departing from the true spirit and scope of the invention as defined in the appended claims.

What I claim is:

1. A method of controlling spray pattern configuration in a fluid spray issued from a spray nozzle of the fluidic oscillator type which includes an inlet passage for receiving pressurized fluid to be sprayed, a chamber for receiving a jet of said fluid passed by said inlet passage, means for oscillatorily deflecting said jet, and an outlet opening for issuing said oscillatorily deflected jet to ambient as said fluid spray, said method comprising the step of varying the static pressure in chamber, independently of said means for oscillatorily deflecting.

2. The method according to claim 1 wherein said step of varying includes the step of supplying fluid under pressure to said chamber.

3. The method according to claim 2 wherein said step of supplying fluid under pressure comprises supplying said fluid to be sprayed to said chamber, under pressure, simultaneously with supplying said fluid to be sprayed to said inlet passage.

4. The method of controlling frequency in a fluidic oscillator of the type comprising a power nozzle for receiving working fluid under pressure and forming a flow of said working fluid, an oscillator chamber for receiving said flow of working fluid, and oscillation means for inducing a cyclic flow pattern of said working fluid in said chamber, said method comprising the step of supplying adjustable flow of working fluid to the oscillator chamber independently of said oscillation means and from a location other than the power nozzle.

[5. The method of oscillating a fluid jet in chamber including the step of cyclically interchanging fluid in a resonant circuit having an inertance and a dynamic compliance, the dynamic compliance corresponding to a vortex flow which alternately changes flow direction at the oscillation frequency, the inertance being a flow conduit interconnecting two locations in said flow chamber on opposite sides of the jet, said step of cyclically interchanging including alternately reversing flow direction in said flow conduit at said oscillation frequency.]

*6. A method of oscillating a fluid jet in a chamber having upstream sidewalls that are substantially spaced from said jet and converging toward said jet in a downstream direction, said method comprising the steps of:*

*cylically interchanging fluid in a resonant circuit having an inertance and a dynamic compliance, the dynamic compliance corresponding to a vortex flow which alternately changes flow direction at the oscillation frequency, the inertance being a flow conduit interconnecting the opposite sides of the upstream end of the chamber at the spaced convergent sidewalls on opposite sides of the jet;*

*said step of cyclically interchanging fluid including alternately reversing flow direction in said flow conduit at said oscillation frequency.*

* * * * *